(12) United States Patent
Zahora et al.

(10) Patent No.: US 7,750,060 B2
(45) Date of Patent: Jul. 6, 2010

(54) RADIATION CURABLE COATING COMPOSITION

(75) Inventors: Edward P. Zahora, Naperville, IL (US); Anthony J. Tortorello, Elmhurst, IL (US); Edward J. Murphy, Arlington Heights, IL (US); Anthony F. Toussaint, Chicago, IL (US); Timothy P. Reichert, Crawfordsville, IN (US); Kelly A. Hawkinson, Aurora, IL (US)

(73) Assignee: DSM IP Assets B.V., Heerlen (NL)

( * ) Notice: Subject to any disclaimer, the term of this patent is extended or adjusted under 35 U.S.C. 154(b) by 759 days.

(21) Appl. No.: 11/250,422

(22) Filed: Oct. 17, 2005

(65) Prior Publication Data

US 2006/0084716 A1 Apr. 20, 2006

Related U.S. Application Data

(60) Provisional application No. 60/618,763, filed on Oct. 15, 2004.

(51) Int. Cl.
*C08F 2/50* (2006.01)
*C08F 2/46* (2006.01)
*C08J 3/28* (2006.01)

(52) U.S. Cl. .............. 522/97; 522/90; 522/96; 522/150; 522/151; 522/152; 522/173; 522/174; 522/182; 428/378; 428/423.1; 427/508; 427/513

(58) Field of Classification Search ......... 522/150, 522/152, 173, 174, 182, 90, 96, 97; 428/378, 428/423.1; 427/508, 513
See application file for complete search history.

(56) References Cited

U.S. PATENT DOCUMENTS

| 4,629,287 | A | * | 12/1986 | Bishop ............... 385/141 |
| 4,973,611 | A | * | 11/1990 | Puder ................. 522/42 |
| 5,146,531 | A | | 9/1992 | Shustack |
| 5,416,880 | A | * | 5/1995 | Edwards et al. ........ 385/128 |
| 5,616,630 | A | * | 4/1997 | Heinze ................ 522/96 |
| 6,023,547 | A | * | 2/2000 | Tortorello ............. 385/114 |
| 6,569,352 | B1 | | 5/2003 | Hillshafer et al. |
| 7,335,718 | B2 | * | 2/2008 | Terwillegar ............ 528/271 |
| 2003/0016924 | A1 | * | 1/2003 | Thompson et al. ....... 385/114 |
| 2003/0100627 | A1 | * | 5/2003 | Bishop et al. .......... 522/153 |
| 2004/0024118 | A1 | | 2/2004 | Weihrauch et al. |
| 2004/0071980 | A1 | * | 4/2004 | McBain et al. ......... 428/424.2 |
| 2008/0113192 | A1 | | 5/2008 | Zahora et al. |

FOREIGN PATENT DOCUMENTS

| EP | 539030 | 4/1993 |
| WO | WO 02/10244 | 2/2002 |
| WO | WO 03/083004 | 10/2003 |
| WO | WO 2004/056902 | 7/2004 |

OTHER PUBLICATIONS

International Search Report for Int'l Appln. No. PCT/NL2005/000737 dated Jan. 19, 2006.
Written Opinion for Int'l Appln. No. PCT/NL2005/000737 dated Jan. 17, 2006.
International Preliminary Report on Patentability for PCT/NL2005/000737 dated Apr. 17, 2007.

* cited by examiner

*Primary Examiner*—Sanza L McClendon
(74) *Attorney, Agent, or Firm*—Nixon & Vanderhye, P.C.

(57) ABSTRACT

The invention relates to a radiation curable composition including a polyester urethane (meth)acrylate oligomer prepared from ortho-carboxylic polyester polyols, where the composition, after cure, has a secant modulus greater than about 600 MPa and an elongation at break of at least about 10%. The invention also relates to coated optical fibers and optical fiber ribbon including at least one coating derived from this composition, and to a process of making these coated optical fibers.

15 Claims, No Drawings

RADIATION CURABLE COATING COMPOSITION

CROSS REFERENCE TO RELATED APPLICATION

This application claims priority to U.S. Provisional Application No. 60/618,763, filed Oct. 15, 2004, which is incorporated herein in its entirety.

FIELD OF THE INVENTION

The invention relates to coated optical fibers and radiation curable compositions which are suitable for use as a coating layer or coating layers in optical fiber technology, such as secondary coating, ribbon matrix material, bundling material, upjacketing or tight-buffer coating, each of which can be colored or not, or ink coating for optical fibers.

DESCRIPTION OF RELATED ART

Glass optical fibers are provided with protective coatings immediately after spinning the molten glass. Generally, two coatings are applied, a primary coating of a relatively soft, flexible resin directly on the glass surface, and a harder resin, a secondary coating, on the primary coating. However, it is also possible to use a single coating instead of a primary and a secondary coating. The individual fibers generally are combined in larger structures such as cables. Cables may comprise individual fibers, or fiber ribbon structures. The optical fiber ribbon generally is made from 2, 4, 6, 8 or 12 optical fibers, generally arranged in a plane, and bonded together with a so-called matrix material. Several ribbons can be bundled together using bundling materials or encapsulating matrix materials. Further, individual fibers often are provided with a coloring or ink layer to be able to identify individual fibers. In certain cases, the individually coated fibers that have a thickness of about 250 μm are provided with a further coating layer to make a thicker and thereby more easy to handle fiber. Such a coating is denoted as an upjacketing coating. All of the materials presently in use for these applications are preferably radiation curable compositions. In many of these compositions a urethane oligomer having a reactive termini and a polymer backbone is present. Furthermore, these compositions generally can include reactive diluents, photoinitiators for UV cure and other suitable additives.

Many materials have been suggested as the polymer backbone for the urethane oligomer. In the synthesis of the oligomer backbone, polyols have been used such as hydrocarbon polyols, polyether polyols, polycarbonate polyols and polyester polyols. Polyester polyols are attractive because of their commercial availability, oxidative stability and versatility. Polyester polyols are described for use in optical fiber coatings in U.S. Pat. No. 5,146,531 and EP-A-539030. Polyester polyols in general are susceptible to hydrolysis. According to EP-A-539030, resistance to hydrolysis may be improved by using a dimer acid as a major part of the polyol synthesis. According to U.S. Pat. No. 5,146,531, the coating composition should be formulated to achieve maximum hydrophobicity, which is achieved in the '531 patent via the selection of hydrophobic monomers, initiators, additives, and so forth. One challenge of using such polyester polyols, is developing compositions whose combination of other physical and chemical properties will result in suitable optical fiber coatings while maintaining the desirable resistance to hydrolysis and hydrophobicity.

It is an object of the present invention to provide a secondary coating composition (including a color and/or clear secondary coating composition), matrix or bundling composition, ink or upjacketing composition for an optical fiber including a polyester urethane acrylate oligomer and having good mechanical properties. The composition, when cured, can provide appropriate high modulus, elongation at break and glass transition temperature (Tg) for each respective type of coating.

It is an object of the present invention to provide a secondary coating, ink, matrix, bundling material or upjacketing coating including a polyester urethane acrylate oligomer and exhibiting good hydrolytic stability as well as other properties as defined herein.

It is another object of the invention to obtain an optical fiber or optical fiber ribbon, or optical fiber cable including a secondary coating, ink, matrix or upjacketing coating as defined above.

It is a further object of the invention to provide a process of making a coated optical fiber using at least one of said secondary coating, ink, matrix or upjacketing coating as defined above.

SUMMARY OF THE INVENTION

One or more of the above objects can be obtained by a radiation-curable coating composition including a polyester urethane (meth)acrylate oligomer prepared from ortho-carboxylic polyester polyols, where the composition, after cure, has a secant modulus of greater than 600 MPa and an elongation at break of at least 10%. Furthermore, the composition can have a glass transition temperature greater than 45° C.

Another embodiment of the invention includes a radiation-curable composition including a polyester urethane (meth)acrylate oligomer prepared from ortho-carboxylic polyester polyols, one or more monomers, and one or more photoinitiators. The composition, after cure, can have a secant modulus greater than about 600 MPa and an elongation at break of at least about 10%. The secant modulus can be from 600 to 1800 MPa, and the elongation at break can be from 10 to 30%. The glass transition temperature $T_g$ can be from 45° C. to 130° C., for example up to 100° C., while the viscosity can be from 1200 mPa·s to 8,000, for example up to 4000 mPa·s at 25° C. or up to 6000 mPa·s at 25° C.

The present discovery relates to a coated optical fiber including a glass optical fiber and a secondary coating, a coated optical fiber including a glass optical fiber, a secondary coating and an upjacketing coating, a coated optical fiber including a glass optical fiber and a single coating, and a coated optical fiber including a glass optical fiber, a single coating and an upjacketing coating. Each coated fiber can have an ink composition applied to it. The present discovery also relates to an optical fiber ribbon including at least two of the coated and optionally inked optical fibers where at least one of the coating or composition is derived from a radiation-curable composition as described above.

As another embodiment of the invention, a process of making a coating from the compositions is provided. The compositions of the present invention can be used to provide coatings for various applications, for instance in optical fiber, ribbon, encapsulating fiber, upjacketing fiber and photonics crystal fiber.

Additional objects, advantages and features are set forth in this specification, and in part will become apparent to those skilled in the art on examination of the following, or may be learned by practice of the invention. The discoveries disclosed in this application are not limited to any particular set of or combinations of objects, advantages and features. It is contemplated that various combinations of the stated objects, advantages and features make up the inventions disclosed in this application.

DETAILED DESCRIPTION OF THE INVENTION

For the sake of simplicity, the term "(meth)acrylate" is used to refer to methacrylate and acrylate functionality. Generally, acrylates are preferred over methacrylates because compositions having higher cure speeds can be obtained.

The present invention provides a radiation curable composition including a polyester urethane (meth)acrylate oligomer prepared from ortho-carboxylic polyester polyols, where the composition, after cure, has a secant modulus greater than 600 MPa and an elongation at break at least 10%. The composition can also have a glass transition temperature Tg greater than about 45° C.

Polyester Urethane (Meth)Acrylate Oligomers:

The radiation curable composition according to the present invention includes a polyester urethane (meth)acrylate oligomer which is comprised of a polyester backbone, reactive termini that provide the radiation curable property to the oligomer, and urethane linking groups.

Ortho-Carboxylic Polyester Polyols:

Ortho-carboxylic polyester polyols can be formed by reaction of certain ortho-carboxylic diacids or cyclohexane 1,2 dicarboxylic acids with excess amounts of certain alcohols.

As the acid component, suitable diacids include phthalic acid, phthalic anhydride, and cyclohexane 1,2 dicarboxylic acid and substitutions thereof.

Suitable diol components for use in the present invention are diols comprising 4-30 carbon atoms such as for example 2-methyl-1,3-propane diol, 2,2-dimethyl-1,3-propanediol, 2-ethyl-1,3-propanediol, 2,2-diethyl-1,3-propanediol, 2-propyl-2-methyl-1,3-propanediol. Other diol compounds for making the polyester oligomer may comprise 2-50 carbon atoms such as for example, 1,4-butanediol, 1,6-hexanediol, 1,2-, 1,3- or 1,4-cyclohexanediol, ethoxylated bisphenol-A, 1,2-propanediol, ethylene glycol, diethylene glycol, dipropylene glycol.

It is desirable to use polyester polyols made from phthalic anhydride and polyols such as diethylene glycol, methyl propanediol, neopentyl glycol. These polyester polyols provide good hydrolytic stability for the coating.

Examples of commercially available ortho-carboxylic polyester polyols include StepanPol® PS2002, Agent 1958-49, StepanPol® PS3152, and StepanPol® PS4002 from Stepan Company, Northfield, Ill. Polyester polyols are also commercially available from Kuraray Co., Ltd under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010 and PNOA-2010.

The viscosity of the ortho-carboxylic polyester polyol at 25° C. is preferably higher than 4 Pa·s, for example higher than 5.5 Pa·s.

The molecular weight of the ortho-carboxylic polyester polyols used in this invention is greater than 250 and less than 1000, and preferably greater than 400 and less than 900.

Polyester Urethane (Meth)Acrylate Oligomer:

The ortho-carboxylic polyester polyol can be reacted with a polyisocyanate and a compound providing the reactive termini in order to yield the urethane oligomer.

Polyisocyanates are suitable for use in making the compositions of the present invention include diisocyanates, such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, 1,6-hexane diisocyanate, isophorone diisocyanate, methylenebis(4-cyclohexyl) isocyanate, 2,2,4-trimethylhexamethylene diisocyanate, bis(2-isocyanate-ethyl) fumarate, and 2,5 (or 6)-bis(isocyanatemethyl)-bicyclo[2.2.1]heptane. Among these diisocyanates, 2,4-tolylene diisocyanate, isophorone diisocyanate, xylylene diisocyanate, and methylenebis(4-cyclohexylisocyanate) are desired.

These isocyanate compounds are used either individually or in combination of two or more.

The compound providing the reactive termini may include a vinyl-unsaturation such as (meth)acrylate. The reactive termini can be introduced by reacting a hydroxyl functional compound with an isocyanate compound.

Examples of the (meth)acrylate compounds having a hydroxyl group which are suitable for use in the present invention include 2-hydroxyethyl (meth)acrylate, 2-hydroxypropyl (meth)acrylate, 2-hydroxybutyl (meth)acrylate, 2-hydroxy-3-phenyloxypropyl (meth)acrylate.

When an aromatic polyisocyanate is used, the polyester urethane (meth)acrylate oligomer is called an aromatic polyester urethane (meth)acrylate oligomer; when an aliphatic polyisocyanate is used, the polyester urethane (meth)acrylate oligomer is called an aliphatic polyester urethane (meth)acrylate oligomer.

The polyester urethane (meth)acrylate oligomer, when used in a secondary coating composition, preferably has a molecular weight of at least 900, more preferably, at least 1000, even more preferred, greater than 1000. Preferably, its molecular weight is less than 2,000, more preferably, less than 1500, and even more preferably less than 1500, for example 1400.

For a secondary coating using an aromatic polyester urethane (meth)acrylate oligomer the preferred molecular weight is between 1000 and 1400. For a secondary coating using an aliphatic urethane (meth)acrylate oligomer the preferred molecular weight is between 1100 and 1300.

The polyester urethane (meth)acrylate oligomer, when used in a matrix composition, ink or upjacketing composition, has a molecular weight of at least 500, more preferably, at least 1,000, even more preferred, at least 1,500. Preferably, its molecular weight is about 5,000 or less, more preferably, about 4,000 or less, even more preferred, about 2,500 or less, and most preferred, about 2,000 or less.

In one embodiment, the weight percentage (wt %) of the oligomer in the present invention can be less than 90 wt %, relative to the total weight of the radiation curable composition. In an alternative embodiment, the weight percentage (wt %) of the oligomer in the present invention can be 40 wt % to 80 wt %, relative to the total weight of the radiation curable composition. In another embodiment, the wt % of the oligomer in the present invention can be 50 wt % to 70 wt %, relative to the total weight of the radiation curable composition.

Monomers (Reactive Diluents):

One or more monomers as reactive diluent is added to the radiation curable composition to adjust the viscosity of said composition.

Monofunctional monomers, acid-functional monomers, polymerizable monomers containing a vinyl group or a (meth)acryloyl group may be added to the liquid curable resin composition of the present invention. Monofunctional monomers and polyfunctional monomers are included in such polymerizable monomers. Examples of suitable monofunctional monomers include monomers containing a vinyl group, such as N-vinyl pyrrolidone, N-vinyl caprolactam, vinyl imidazole, vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, caprolactone acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, tridecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, beta-carboxyethyl (meth)acrylate, phthalic acid (meth)acrylate, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, butylcarbamylethyl (meth)acrylate, n-isopropyl (meth)acrylamide fluorinated (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether; and compounds represented by the following formula (2)

CH$_2$=C(R$^6$)—COO(R$^7$O)$_m$—R$^8$    (2)

wherein R$^6$ is a hydrogen atom or a methyl group; R$^7$ is an alkylene group containing 2 to 8, preferably 2 to 5 carbon atoms; and m is an integer from 0 to 12, and preferably from 1 to 8; R$^8$ is a hydrogen atom or an alkyl group containing 1 to 12, preferably 1 to 9, carbon atoms; or, R$^8$ is a tetrahydrofuran group-comprising alkyl group with 4-20 carbon atoms, optionally substituted with alkyl groups with 1-2 carbon atoms; or R$^8$ is a dioxane group-comprising alkyl group with 4-20 carbon atoms, optionally substituted with methyl groups; or R$^8$ is an aromatic group, optionally substituted with C$_1$-C$_{12}$ alkyl group, preferably a C$_8$-C$_9$ alkyl group, and alkoxylated aliphatic monofunctional monomers, such as ethoxylated isodecyl (meth)acrylate, ethoxylated lauryl (meth)acrylate, and the like.

Examples of the polyfunctional monomers include monomers containing (meth)acryloyl group such as trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, C7-C20 alkyl di(meth)acrylates, trimethylolpropanetrioxyethyl (meth)acrylate, tris(2-hydroxyethyl) isocyanurate tri(meth)acrylate, tris(2-hydroxyethyl) isocyanurate di(meth)acrylate, pentaerythritol tri(meth)acrylate, pentaerythritol tetra(meth)acrylate, dipentaerythritol monohydroxy pentacrylate, dipentaerythritol hexacrylate, tricyclodecane diyl dimethyl di(meth)acrylate and alkoxylated versions (preferably ethoxylated and/or propoxylated) of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether, adduct of hydroxyethyl acrylate, isophorone diisocyanate and hydroxyethyl acrylate (HIH), adduct of hydroxyethyl acrylate, toluene diisocyanate and hydroxyethyl acrylate (HTH), and amide ester acrylate.

The total weight percentage (wt %) of the monomers, relative to the total weight of the radiation curable composition, can be 5% or more. The total weight percentage (wt %) of the monomers in the present invention can be 10 wt % to 60 wt %, relative to the total weight of the radiation curable composition. Furthermore, in another embodiment, the total wt % of the monomers in the present invention can be 20 wt % to 50 wt %, relative to the total weight of the radiation curable composition.

Photoinitiators:

The liquid curable resin composition of the present invention can be cured by radiation such as visible light, ultraviolet light, electron beam and the like. A photoinitiator can also be added to the liquid curable resin composition of the present invention.

The photoinitiators are desirably free radical photoinitiators. Free-radical photoinitiators are generally divided into two classes according to the process by which the initiating radicals are formed. Compounds that undergo unimolecular bond cleavage upon irradiation are termed Type I or homolytic photoinitiators. If the excited state photoinitiator interacts with a second molecule (a co-initiator) to generate radicals in a bimolecular reaction, the initiating system is termed a Type II photoinitiator. In general, the two main reaction pathways for Type II photoinitiators are hydrogen abstraction by the excited initiator or photoinduced electron transfer, followed by fragmentation.

Examples of suitable Type I homolytic free-radical photoinitiators are benzoin derivatives, methyloylbenzoin and 4-benzoyl-1,3-dioxolane derivatives, benzilketals, α,α-dialkoxyacetophenones, α-hydroxy alkylphenones, α-aminoalkylphenones, acylphosphine oxides, bisacylphosphine oxides, acylphosphine sulphides, halogenated acetophenone derivatives, and the like. Commercial examples of suitable Type I photoinitiators are Irgacure 651 (benzildimethyl ketal or 2,2-dimethoxy-1,2-diphenylethanone, Ciba-Geigy), Irgacure 184 (1-hydroxy-cyclohexyl-phenyl ketone as the active component, Ciba-Geigy), Darocur 1173 (2-hydroxy-2-methyl-1-phenylpropan-1-one as the active component, Ciba-Geigy), Irgacure 907 (2-methyl-1-[4-(methylthio)phenyl]-2-morpholino propan-1-one, Ciba-Geigy), Irgacure 369

(2-benzyl-2-dimethylamino-1-(4-morpholinophenyl)-butan-1-one as the active component, Ciba-Geigy), Esacure KIP 150 (poly {2-hydroxy-2-methyl-1-[4-(1-methylvinyl)phenyl]propan-1-one}, Fratelli Lamberti), Esacure KIP 100 F (blend of poly {2-hydroxy-2-methyl-1-[4-(1-methylvinyl) phenyl]propan-1-one} and 2-hydroxy-2-methyl-1-phenyl-propan-1-one, Fratelli Lamberti), Esacure KTO 46 (blend of poly {2-hydroxy-2-methyl-1-[4-(1-methylvinyl)phenyl]propan-1-one}, 2,4,6-trimethylbenzoyldiphenylphosphine oxide and methylbenzophenone derivatives, Fratelli Lamberti), acylphosphine oxides such as Lucirin TPO (2,4,6-trimethylbenzoyl diphenyl phosphine oxide, BASF), Irgacure 819 (bis (2,4,6-trimethylbenzoyl)-phenyl-phosphine-oxide, Ciba-Geigy), Irgacure 1700 (25:75% blend of bis (2,6-dimethoxybenzoyl)2,4,4-trimethylpentyl phosphine oxide and 2-hydroxy-2-methyl-1-phenyl-propan-1-one, Ciba-Geigy), and the like. Also mixtures of type I photoinitiators can be used. For colored (e.g. pigmented) systems, phosphine oxide type photoinitiators and Irgacure 907 are preferred.

Examples of suitable Type-II (hydrogen abstraction) photoinitiators are aromatic ketones such as benzophenone, xanthone, derivatives of benzophenone (e.g. chlorobenzophenone), blends of benzophenone and benzophenone derivatives (e.g. Photocure 81, a 50/50 blend of 4-methyl-benzophenone and benzophenone), Michler's Ketone, Ethyl Michler's Ketone, thioxanthone and other xanthone derivatives like Quantacure ITX (isopropyl thioxanthone), benzil, anthraquinones (e.g. 2-ethyl anthraquinone), coumarin, and the like. Chemical derivatives and combinations of these photoinitiators can also be used.

Type-II photoinitiators generally are used together with an amine synergist. Preferably, the amine synergist is a monomer tertiary amine compound, an oligomer (polymer) tertiary amine compound, a polymerizable amino acrylate compound, a polymerized amino acrylate compound or mixtures thereof. The amine-synergist may include tertiary amine compounds, such as alkanol-dialkylamines (e.g., ethanol-diethylamine), alkyldialkanolamines (e.g. methyldiethanolamine), trialkanolamines (e.g. triethanolamine), and ethylenically unsaturated amine-functional compounds including amine-functional polymer compounds, copolymerizable amine acrylates, and the like. The ethylenically unsaturated amine compounds may also include dialkylamino alkyl (meth)acrylates (e.g., diethylaminoethylacrylate) or N-morpholinoalkyl-(meth)acrylates (e.g., N-morpholinoethyl-acrylate).

The photoinitiator can be an oligomeric or polymeric photoinitiator. An oligomeric photoinitiator includes a plurality of radiation-absorbing groups that generate radicals upon exposure to radiation. Preferably, the oligomer includes 3 or more, preferably 5-100, radiation-absorbing groups and has a molecular weight of at least 800 g/mol. Specifically, oligomeric photoinitiators can include an aryl group, preferably an arylketone groups.

Suitable oligomeric photoinitiators have a backbone constructed from 2 or more monomeric units, preferably 3 to 50 monomeric units. A monomeric unit of the oligomer can include any of a variety of monomers including styrene, preferably alpha-methyl styrene. The backbone of the oligomer may include any suitable polymer units including a polyester, polyether, polycarbonate, polyolefin, polysiloxane and/or polyacrylate units. In particular, the oligomeric photoinitiator can include an oligomer containing a phenyl hydroxyalkyl ketone group, preferably a phenyl alpha-hydroxyalkyl ketone group. For example, the oligomeric photoinitiator can include an oligomer of 2-hydroxy-2-methyl-1-phenyl(4-(1-methylvinyl)phenyl)-1-propanone as well as 2-hydroxy-2-methyl-1-phenyl-1-propanone. The oligomeric photoinitiator can include Esacure KIP 100F, available from Sartomer Corporation.

One or more photoinitiators can be used in the radiation curable composition.

The total weight percentage (wt %) of the photoinitiators, relative to the total weight of the radiation curable composition can be less than 15%. Furthermore, the total wt % of the photoinitiators can be 0 wt % to 10 wt %, relative to the total weight of the radiation curable composition. Finally, the total wt % of the photoinitiators can be 0 wt % to 5 wt %, relative to the total weight of the radiation curable composition.

Additives:

An amine compound can be added to the liquid curable resin composition of the present invention as an additive to prevent generation of hydrogen gas, which causes transmission loss in the optical fibers. As examples of the amine that can be used herein, diallylamine, diisopropylamine, diethylamine, diethylhexylamine, and the like can be given.

In addition to the above-described components, various additives such as antioxidants, UV absorbers, light stabilizers, silane coupling agents, coating surface improvers, heat polymerization inhibitors, leveling agents, slip additives, releasing agents, surfactants, colorants, preservatives, plasticizers, lubricants, solvents, fillers, aging preventives, and wettability improvers can be used in the liquid curable resin composition of the present invention, as required.

Commercially available antioxidants which can be used are BHT, MEHQ, HQ, IRGANOX 1010, 1035, 1076, 1222 (Ciba Geigy), ANTIGEN P, 3C, FR, GA-80 (Sumitomo Chemical Industries Co., Ltd.), and the like. As UV absorbers, TINUVIN P, 234, 320, 326, 327, 328, 329, 213 (Ciba Geigy), SEESORB 102, 103, 110, 501, 202, 712, 704 (manufactured by Sypro Chemical Co.) can be given.

Commercially available photo-stabilizers include Tinuvin 292,144, 622LD (manufactured by Ciba Geigy), Sanol LS770 (manufactured by Sankyo Chemical Co.), and SUMI-SORB TM-061 (manufactured by Sumitomo Chemical Industries).

Examples of suitable silane coupling agents include .gamma.-aminopropyltriethoxy silane, .gamma.-mercaptopropyltrimethoxy silane, .gamma.-methacryloxypropyl-trimethoxy silane, and commercial products such as SH6062, SH6030 (Toray Silicone Co.) and KBE903, KBE603, KBE403 (Shin-etsu Chemical Co.).

Examples of silicone additives as leveling agents, slip additives, releasing agents, surface improvers include dimethylsiloxane polyether and commercially available products, such as DC-57, DC-190 (Dow Corning), SH-28PA, SH-29PA, SH-30PA, SH-190 (Tora.gamma.-Dow Corning), KF351, KF352, KF353, KF354 (Shin-Etsu Chemical Industries), and L-700, L-7002, L-7500, FK-024-90 (Nippon Uniker), Ebecryl 350, Tegorad 2200N.

The amount of additives can be in the range, for example, of from about 0.01 wt % to about 7.0 wt %; the amount of additives can be from about 0.1 wt % to about 5 wt %; Finally, the amount of additives can be from about 0.5% to about 4 wt %.

In the case of colored secondary coating, ink and colored matrix compositions, the colorant can be a pigment or dye, with the dye being reactive or non reactive. Suitable dyes include polymethine dyes such as cyanines, hemicyanines, streptocyanines, and oxonols, di and triarylmethine dyes such as Michler's hydrol, malachite green, aza analogues of diarylmethine dyes, aza (18) annulenes (or natural dyes), nitro and nitroso dyes such as amido yellow, naphthol yellow, 2,4-dinitro-1-naphthol-7-sulfonic acid, azo dyes, anthraquinone dyes and sulfur dyes such as Condense Sulfur Orange.

The pigment can be any pigment suitable for use in colored optical fiber coatings. Preferably the pigment can be in the form of small particles and can be capable of withstanding UV-radiation. Examples of suitable pigments include but are not limited to, titanium dioxide white (DuPont R-960),carbon black (Degussa Special 4A), lamp black (General carbon LB#6), phthalo blue G (Sun 249-1282), phthalo Green Y (Mobay G5420), light chrome yellow (Cookson BT698D), diarylide yellow (Sun 274-3954), yellow oxide (Pfizer YL02288D), lead free-yellow (BASF Paliotol 1770), raw umber (Hoover 195), burnt umber (Lansco 3240X,), lead free orange (Hoechst RL70), red oxide (Pfizer R2998D) moly orange (Cookson YL988D), arylide red (Hoechst F5RKA), quinacridone red (Ciba RT759D), quinacridone violet (Ciba RT887D).

The pigment can have a mean particle size of no more than about 1 micron. The particle size of the commercial pigments can be lowered by milling, if necessary. The pigment can be present in an amount of 1 wt % to 10 wt %, or in an amount of 3 wt % to 8 wt %.

To protect good color with longevity of the dye during curing while maintaining good thermal or oxidative stability of coating, a stabilizer package including antioxidant, UV light stabilizer and/or UV absorber can be preferably employed.

Coating Properties:

The composition of the present invention, after curing, can have a secant modulus of at least 600 MPa. In one embodiment, the coating composition of the present invention, after curing, can have a secant modulus of 600 MPa to 1800 MPa. In another embodiment, the coating composition of the present invention, after curing, can have a secant modulus of 700 MPa to 1500 MPa.

The composition of the present invention, after curing, can have an elongation at break of at least 10%; the composition of the present invention, when cured, can have an elongation at break of at least 12%. In one embodiment, the composition, after curing, can have an elongation at break of from 10% to 30%.

The radiation curable composition of the present invention can have a viscosity of 1200 mPa·s to 8000 mPa·s at 25° C. The viscosity of the radiation curable composition can be 1300 mPa·s to 6000 mPa·s at 25° C. The viscosity of the radiation curable composition can be 1400 mPa·s to 4000 mPa·s at 25° C.

In one embodiment, the composition of the present invention can have a glass transition temperature Tg of at least 45° C. In another embodiment, the composition of the present invention can have a glass transition temperature Tg of 45° C. to 130° C., for example a Tg of at least 50° C. or at least 53° C. or a Tg no higher than 100° C.

The composition of the present invention, when cured can be hydrolytically stable to such an extent that the coating maintains mechanical integrity when aged at 85° C. and 85% relative humidity for 2, 4, 8 and 12 weeks. Mechanical integrity means that the coating sample remains intact to such an extent that the coating sample can be measured in a DMA measurement as described in more detail in the description of test methods. Preferably, the coating composition does not fall apart when a sample is prepared for the DMA measurement.

The composition of the present invention, when cured and aged for 2 weeks under 85° C. and 85% Relative Humidity showed a change in equilibrium modulus $E_o$ of about 20% or less. In another embodiment, the change in equilibrium modulus $E_o$ after aging for 2 weeks was 10% or less. When cured and aged for 4 weeks under 85° C. and 85% Relative Humidity, the composition showed a change in equilibrium modulus of 23% or less. In another embodiment, the change in equilibrium modulus $E_o$ after aging for 4 weeks was 21% or less. When cured and aged for 8 weeks under 85° C. and 85% Relative Humidity showed a change in equilibrium modulus of 25% or less. In another embodiment, the change in equilibrium modulus $E_o$ after aging for 8 weeks was about 23% or less. When cured and aged for 12 weeks under 85° C. and 85% Relative Humidity the composition showed a change in equilibrium modulus of 28% or less. In another embodiment, the change in equilibrium modulus Eo after aging for 12 weeks was 25% or less.

The invention will be further elucidated by the following examples and test methods.

EXAMPLES

The following examples are given as particular embodiments of the invention and to demonstrate the practice and advantages thereof. It is to be understood that the examples are given by way of illustration and are not intended to limit the specification or the claims that follow in any manner.

The following component names and definitions are used in the Examples and are understood to refer to the compounds or compositions noted:

TDI 80 is toluene diisocyanate from Bayer

IPDI is isophorone diisocyanate from Lyondell

HEA is hydroxyethylacrylate from Rohm & Hass

PEA SR-339A is phenoxyethyl acrylate from Sartomer

HDDA SR-238 is 1,6 hexanediol diacrylate from Sartomer

EONPA SR-504D is ethoxylated nonyl phenol acrylate from Sartomer

IBOA SR-506 is isobornyl acrylate from Sartomer

SR-531 is cyclic trimethylolpropane formal acrylate from Sartomer

SR-306 TPGDA is tripropylene glycol diacrylate from Sartomer

SR-351, TMPTA is trimethylolpropane triacrylate from Sartomer

SR-349, BPAEDA is bisphenol A ethoxylated diacrylate from Sartomer

Chivacure TPO is 2,4,6-trimethylbenzoyl diphenyl phosphine oxide, available from Chitec Chemical Company, Ltd.

Irgacure 184 is 1-hydroxy-cyclohexyl-phenyl ketone, available from Ciba.

Irganox 1035 is Thiodiethylene bis(3,5-di-tert-butyl-4-hydroxy hydrocinnamate) from Ciba.

DC 57 is a polysiloxane from Dow Corning.

DC 190 is (dimethylsiloxane)-(polyoxypropylene/polyoxyethylene glycol acetate) copolymer from Dow Corning.

The term "urethane content" is defined as the content of NHCOO groups in the oligomer. The term wt % of urethane content is defined as the weight (in grams) of NHCOO groups present in one hundred grams of oligomer.

The term "orthocarbonyl moiety or group" is defined as the COC6H4CO group or moiety in the structure of the oligomer. The term wt % of orthocarbonyl moiety content is defined as the weight (in grams) of COC6H4CO groups present in one hundred grams of oligomer.

The % urethane content in the oligomer is calculated by the formula:

$$\% \text{ urethane content} = \frac{59.02 \times \text{eq NHCOO groups in oligomer}}{\text{mass}} \times 100$$

where the mass is either the actual mass or if estimated, the oligomer MW.

The % aromatic ortho-carbonyl moiety content in the oligomer is calculated by the formula:

$$\% \text{ aromatic ortho-carbonyl moiety content} = \frac{\text{mass of ortho-carbonyl in oligomer MW}}{\text{total oligomer MW}} \times 100$$

where: the mass ortho-carbonyl in oligomer MW=n×132
n=number of repeat units and 132 is the MW of COC6H4CO Synthesis of Ortho-Carboxylic Polyester Polyols:

Ortho-carboxylic polyester polyols a-f in Table 1 were used to prepare polyester urethane (meth)acrylate oligomers. The synthesis of the ortho-carboxylic polyester polyols is well known in the art; ortho-carboxylic polyester polyols a, b, d and e were synthesized in a similar manner to the method described in patent U.S. Pat. No. 6,569,352, using phthalic anhydride and diethylene glycol; this patent is hereby incorporated by reference. Ortho-carboxylic polyester polyols c and f are commercially available from Stepan Company, Northfield, Ill.

Synthesis of Polyester Urethane (Meth)Acrylate Oligomers:

a. Synthesis of Aromatic Polyester Urethane (Meth)Acrylate Oligomers:

The procedure for the synthesis of aromatic urethane polyester oligomers was modified slightly. Again an equivalent ratio of 2:2:1 HEA:aromatic isocyanate:O—C polyester polyol was used. In this case the isocyanate and BHT stabilizer were added to the flask and mixed just prior to addition of HEA. The HEA was then added in a period of 45-60 min and the temperature was allowed to rise to 60 C. After HEA addition was complete, the temperature was held at 60° C. for 1 hour after which time the urethane catalyst, dibutyl tin dilaurate was added. The temperature was held at 60° C. until an NCO-value of 12% was in 15-30 min and the temperature was allowed to increase to 80° C. Addition recorded. At this point, the ortho-carboxylic polyester polyol was added in 15-30 min and the temperature was allowed to increase to 80° C. Addition of the ortho-carboxylic polyester polyol was followed by addition of about 20 wt % of a diluent monomer (2-phenoxyethyl acrylate also called PEA, or isobornyl acrylate called IBOA), relative to the total wt % of the reactants and the diluent, resulting in an oligomer composition that is 4 parts oligomer:1 part diluent. The temperature was again increased to 80° C. and held until an NCO-value less than 0.1% was recorded. The characteristics of the resulting aromatic urethane oligomers are shown in Table 2.

b. Synthesis of Aliphatic Polyester Urethane (Meth)Acrylate Oligomers:

The ortho-carboxylic polyester polyols and aliphatic isocyanates were used in the synthesis of aliphatic urethane polyester oligomer, generally with an equivalent ratio of 2:2:1 of HEA:aliphatic isocyanate:polyester polyol. A diluent was used (PEA) in about 20 wt. % of the total wt % of the reactants and the diluent, resulting in an oligomer composition that is 4 parts oligomer:1 part diluent. As a urethanizing catalyst, dibutyl staneous dilaurate was used, together with some BHT as stabilizer each generally at 500 ppm. The isocyanate was mixed with the stabilizer and catalyst. The HEA was slowly added in 1-1.5 hrs and the mixture was kept at a temperature of below 35° C. Thereafter, the temperature was increased to 40° C. and when the NCO-value was 15%, the ortho-carboxylic polyester polyol was added. The temperature was allowed to increase to 80° C. and the reaction was ended when the amount of NCO was lower than 0.1%. The characteristics of the resulting aliphatic urethane oligomers are shown in Table 2.

TABLE 1

| Ortho-Carboxylic (O-C) Polyester Polyols | | | | | | | |
|---|---|---|---|---|---|---|---|
| O-C Polyester polyol | a | b | c | d | e | f | g |
| Polyester polyol code | ZW5674 | ZW5654 | StepanPol ®PS2002 | ZW5700 | ZW5699 | Agent 1958-49 | PD200 LV |
| Molecular weight (est.) | 450 | 550 | 550 | 750 | 1000 | 2000 | 550 |
| Hydroxyl value, mgKOH/g | 259 | 205 | 198.7 | 140 | 104 | 55.1 | 200 |
| Acid value, mgKOH/g | 0.9 | 1.5 | 0.7 | 2.7 | 4.6 | 0.9 | 1.0 |
| Viscosity, Pa · s (25° C.) | 8.2 | 26.8 | 25.5 | 166.0 | 642.5 | >1000 | 3.5 |
| Gardner color (est.) | 1-2 | 1-2 | 1-2 | 3-4 | 3-4 | 2-3 | 1-2 |

TABLE 2

| Characteristics of polyester urethane (meth)acrylate oliqomers | | | | | | | |
|---|---|---|---|---|---|---|---|
| Aromatic oligomers 100% | A1 | B1 | C1 | D1 | E1 | F1 | G1 |
| Oligomer mole ratio (HEA:TDI-80:O-C Polyester Polyol) | 2:2:1 | 2:2:1 | 2:2:1 | 2:2:1 | 2:2:1 | 2:2:1 | 2:2:1 |
| O-C Polyester Polyol | a | B | c | d | e | f | g |
| Gardner color (est.) | 1-2 | 1-2 | 1-2 | 2-3 | 3-4 | 2-3 | 1-2 |

TABLE 2-continued

Characteristics of polyester urethane (meth)acrylate oliqomers

| NCO (%) | 0.04 | 0.04 | 0.02 | 0.07 | 0.10 | 0.03 | <0.1 |
|---|---|---|---|---|---|---|---|
| Molecular weight (cal'd.) | 1029.5 | 1131.5 | 1146.4 | 1386.5 | 1668.7 | 2624.2 | 1146.4 |

| Aliphatic oligomers 100% | A2 | C2 | D2 | E2 | F2 |
|---|---|---|---|---|---|
| Oligomer mole ratio (HEA:IPDI:O-C Polyester Polyol) | 2:2:1 | 2:2:1 | 2:2:1 | 2:2:1 | 2:2:1 |
| O-C Polyester Polyol | a | c | D | e | f |
| Gardner color (est.) | 1-2 | 1-2 | 1-2 | 2-3 | 2-3 |
| NCO (%) | 0.05 | 0.10 | 0.08 | 0.09 | 0.06 |
| Molecular weight (cal'd.) | 1116.0 | 1247.0 | 1479.7 | 1772.6 | 2740.9 |

Preparation of Aromatic Urethane Polyester Compositions (Examples 1-13):

Aromatic urethane polyester compositions and aliphatic urethane polyester compositions were prepared by admixing the respective components shown in Table 3 and Table 4 with the properties of each coating. The properties of the coatings after cured were evaluated using test methods described in the below "test methods" sections.

TABLE 3

Examples 1-4 and Comparative Example 1-8: Aromatic Urethane Polyester Coatings

| Example | 1 | 2 | 3 | 4 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|
| Orthocarbonyl % (C8H4O2) | 28.0 | 28.0 | 32.3 | 28.0 | 36.4 | 43.2 | 23.1 | 28.0 | 28.0 | 28.0 | 28.0 | 28.0 |
| Urethane % (NHCOO) | 20.6 | 20.6 | 17.1 | 20.6 | 14.2 | 9.0 | 23.3 | 20.6 | 20.6 | 20.6 | 20.6 | 20.6 |
| MW (est.) of polyester polyol in oligomer | 550 | 550 | 750 | 550 | 1500 | 2000 | 450 | 550 | 550 | 550 | 550 | 550 |
| Aromatic Oligomer A1 | | | | | | | | 54.4 | | | | |
| Aromatic Oligomer B1 | 54.4 | | | | | | | | | | | |
| Aromatic Oligomer C1 | | 54.4 | | 48 | | | | | 48 | | | |
| Aromatic Oligomer D1 | | | 54.4 | | | | | | | | | |
| Aromatic Oligomer E1 | | | | | 54.4 | | | | | | | |
| Aromatic Oligomer F1 | | | | | | 54.4 | | | | | | |
| Aromatic Oligomer G1 | | | | | | | | | | 54.4 | 54.4 | 62.4 | 62.4 |
| PEA SR 339A* | 23.6 | 23.6 | 23.6 | 10 | 23.6 | 23.6 | 23.6 | | 20.6 | 20.6 | 15.6 | 15.6 |
| HDDA SR-238 | 16.5 | 16.5 | 16.5 | 6 | 16.5 | 16.5 | 16.5 | 6 | 16.5 | | 16.5 | |
| EONPA SR-504D | | | | 15 | 45 | | | 25 | 3 | 3 | | |
| TMPTA SR-351 | | | | | | | | | | 16.5 | | 16.5 |
| IBOA SR-506** | | | | 12 | | | | 12 | | | | |
| Vinyl Caprolactam | | | | 5 | | | | 5 | | | | |
| Chivacure TPO | 0.5 | 0.5 | 0.5 | 0.5 | 0.5 | 0.5 | 0.5 | 0.5 | 0.5 | 0.5 | 0.5 | 0.5 |
| Irgacure 184 | 4 | 4 | 4 | 3 | 4 | 4 | 4 | 3 | 4 | 4 | 4 | 4 |
| Irganox 1035 | 0.5 | 0.5 | 0.5 | | 0.5 | 0.5 | 0.5 | | 0.5 | 0.5 | 0.5 | 0.5 |
| DC 57 | 0.17 | 0.17 | 0.17 | 0.17 | 0.17 | 0.17 | 0.17 | 0.17 | 0.17 | 0.17 | 0.17 | 0.17 |
| DC 190 | 0.33 | 0.33 | 0.33 | 0.33 | 0.33 | 0.33 | 0.33 | 0.33 | 0.33 | 0.33 | 0.33 | 0.33 |
| Total | 100 | 100 | 100 | 100 | 100 | 100 | 100 | 100 | 100 | 100 | 100 | 100 |
| Viscosity (mPa-s) 25° C. | 4275 | 3800 | 3870 | 4030 | 4253 | 4840 | 4680 | 7800 | 2900 | 9300 | 8400 | N/A |
| Tensile (MPa) | 44 | 37 | 30 | 32 | 27 | 13 | 57 | 31 | 18 | 28 | 22 | N/A |
| Thixotropy (NT = Non-thixo.) | NT | NT | NT | NT | NT | NT | NT | NT | Thixo. | Thixo. | Thixo. | Thixo. |
| Elongation (%) | 14 | 15 | 19 | 53 | 36 | 36 | 8 | 67 | 26 | 16 | 33 | N/A |
| Secant Modulus (MPa) | 1139 | 1023 | 877 | 807 | 522 | 119 | 1379 | 511 | 307 | 723 | 392 | N/A |
| E' @ 1000 Mpa | 39 | 35.6 | 32.7 | N/A | 28.8 | 19.1 | 43.3 | N/A | N/A | | | |
| E' @ 100 Mpa | 52.7 | 53.5 | 46 | N/A | 42.1 | 32.8 | 56.4 | N/A | | | | |
| E° (E' @ Equilib.) | 22.8 | 24.7 | 18.5 | 12.6 | 17 | 12 | 25.4 | 12.2 | | | | |
| Tan (δ)max (Tg; ° C.) | 51.5 | 53.3 | 45.7 | 52 | 42.5 | 34 | 55.4 | 51 | | | | |

*This amount includes the quantity of diluent introduced in the oligomer synthesis. for Exs. 6-8 and Comp. Exs. 1-3 and 5-8.
**This amount includes the quantity of diluent introduced in the oligomer synthesis for Ex. 4 and Comp. Ex. 4.

TABLE 4

Examples 5, 6 and Comparative Examples 9-11:
Aliphatic Urethane Polyester Coatings:

| Example | 5 | 6 | Comp. Ex. 9 | Comp. Ex. 10 | Comp. Ex. 11 |
|---|---|---|---|---|---|
| Orthocarbonyl % (COC6H4CO) | 21.3 | 25.3 | 30.3 | 34.2 | 41.4 |
| Urethane % (NHCOO) | 21.3 | 19.0 | 16.0 | 13.4 | 8.7 |
| MW (est.) of polyester polyol in oligomer | 450 | 550 | 750 | 1000 | 2000 |
| Aliphatic Oligomer A2 | 54.4 | | | | |
| Aliphatic Oligomer C2 | | 54.4 | | | |
| Aliphatic Oligomer D2 | | | 54.4 | | |
| Aliphatic Oligomer E2 | | | | 54.4 | |
| Aliphatic Oligomer F2 | | | | | 54.4 |
| PEA SR 339A* | 23.6 | 23.6 | 23.6 | 23.6 | 23.6 |
| HDDA SR-238 | 16.5 | 16.5 | 16.5 | 16.5 | 16.5 |
| Chivacure TPO | 0.5 | 0.5 | 0.5 | 0.5 | 0.5 |
| Irgacure 184 | 4 | 4 | 4 | 4 | 4 |
| Irganox 1035 | 0.5 | 0.5 | 0.5 | 0.5 | 0.5 |
| DC 57 | 0.17 | 0.17 | 0.17 | 0.17 | 0.17 |
| DC 190 | 0.33 | 0.33 | 0.33 | 0.33 | 0.33 |
| Total | 100 | 100 | 100 | 100 | 100 |
| Viscosity (mPa-s) @ 25° C. | 2619 | 2682 | 2807 | 3007 | 3524 |
| Tensile (MPa) | 40 | 33 | 26 | 25 | 14 |
| Elongation (%) | 21 | 26 | 36 | 37 | 40 |
| Secant Modulus (Mpa) | 1194 | 956 | 474 | 378 | 99 |
| E' @ 1000 Mpa | 39.5 | 37.4 | 28.8 | 28.2 | 19.5 |
| E' @ 100 Mpa | 53 | 51.8 | 41 | 41.2 | 32.1 |
| E° (E' @ Equilib.) | 21 | 22 | 16 | 16 | 13 |
| Tan (δ)max (Tg; ° C.) | 52 | 51.3 | 41.5 | 42 | 32.7 |

*This amount includes the quantity of diluent referred to in the synthesis section for Exs. 5-6 and Comp. Exs. 9-11.

TABLE 5

Hydrolytic stability (% Change in Equilibrium Modulus (E°) after 85° C./85% Relative Humidity)

| Coating | Property | Initial | 2 Weeks | 4 Weeks | 8 Weeks | 12 Weeks |
|---|---|---|---|---|---|---|
| Ex. 4 | E° (MPa) | 12.6 | 11.5 | 11.9 | 10.5 | 9.7 |
| | % Change | | −8.7 | −5.6 | −16.7 | −23.0 |
| Comp. Ex. 4 | E° (MPa) | 12.2 | 11.1 | 11.4 | 11.2 | 10.1 |
| | % Change | | −9.0 | −6.6 | −8.2 | −17.2 |

TEST METHODS a. Mechanical Measurements

Tensile Strength, Elongation, and Modulus Test Method:

The tensile properties of cured samples were tested using a universal testing instrument, Instron Model 4201 equipped with a suitable personal computer and Instron software to yield values of tensile strength, percent elongation at break, and secant or segment modulus. Load cells had a 2 or 20-pound capacity, or metric equivalents.

To prepare the samples for testing, a 75-micron film is drawn down on 4-mil Mylar (100 micron thickness) attached to a glass plate and cured at 1 J/cm² using a D-lamp, under Nitrogen. The cured film was conditioned at 23±0.2° C. and 50±0.5% Relative Humidity for a minimum of sixteen hours prior to testing. A minimum of eight test specimens, having a width of 0.5+0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton-tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded. If the top surface of the film was talc coated to eliminate tackiness, then a small amount of talc was applied to the bottom surface of test specimen after removal from the substrate.

The average film thickness of the test specimens was determined with a micrometer. At least five measurements of film thickness were made in the area to be tested (from top to bottom) and the average value used for calculations. If any of the measured values of film thickness deviated from the average by more than 10% relative, the test specimen was discarded. Film width was also measured. All specimens came from the same plate, and generally, at least six strips were needed to obtain tensile properties.

The appropriate load cell was determined by consideration of the following equation:

$$[A \times 145] \times 0.0015 = C$$

Where: A=a product's maximum expected tensile strength (MPa); 145=Conversion Factor from MPa to psi; 0.0015=approximate cross-sectional area (in2) of test specimens; and C=lbs. The 2 pound load cell was used for materials where C=1.8 lbs. or less. The 20 pound load cell was used for materials where C was between 1.8 and 19 lbs. If C was higher than 19 lbs, a higher capacity load cell was required. Analogous steps were used for metric load cells.

The crosshead speed was set to 1.00 inch/min (or to a metric value equal to ½ the gage length), and the crosshead action was set to "return at break." The crosshead was adjusted to 2.00 inches jaw separation. The air pressure for the pneumatic grips was turned on and adjusted as follows: set at approximately 60 psi (4.5 kg/cm²) for secondary optical fiber coatings and other hard coatings (including ink, matrix, upjacketing). An appropriate Instron computer method was loaded for the coating to be analyzed.

After the Instron test instrument had been allowed to warm-up for fifteen minutes, it was calibrated and balanced following the manufacturer's operating procedures. The temperature near the Instron Instrument was measured and the humidity was measured at the location of the humidity gage. This was done just before beginning measurement of the first test specimen.

Specimens were only analyzed if the temperature was within the range 23±2° C., and the relative humidity was within 50±5%. The temperature was verified as being within this range for each test specimen. The humidity value was verified only at the beginning and the end of testing a set of specimens from one plate.

After calibration and standardization, each test specimen was tested by suspending it into the space between the upper pneumatic grips, such that the test specimen was centered laterally and hanging vertically. The upper grip (only) was locked. The lower end of the test specimen was pulled gently so that it has no slack or buckling, and it was centered laterally in the space between the open lower grips. While holding the specimen in this position, the lower grip was locked.

The sample number and sample dimensions were entered into the data system, following the instructions provided by the software package. Tensile measurement for the sample was then executed with the Instron device. This was repeated for additional specimens. The temperature and humidity were measured after the last test specimen from the current drawdown was tested.

The calculation of tensile properties was performed automatically by the software package. The values for tensile strength, % elongation, and secant modulus were checked to determine whether any one of them deviated from the average enough to be an "outlier." If necessary, the procedure was repeated.

b. DMA Test Method

Dynamic Mechanical Analysis (DMA) was carried out on the test samples, using an RSA-II instrument manufactured by Rheometric Scientific Inc, to measure elastic modulus E', viscous modulus E" and tan delta (E'/E"). A free film specimen cured in the same manner as in the tensile strength, elongation, and modulus test method (typically about 36 mm long, 12 mm wide, and 0.075 mm thick) was mounted in the grips of the instrument, and the temperature initially brought to 80° C. and held there for about five minutes. During the latter soak period at 80° C., the sample was stretched by about 2.5% of its original length. Also during this time, information about the sample identity, its dimensions, and the specific test method was entered into the software (RSI Orchestrator) residing on the attached personal computer.

All tests were performed at a frequency of 1.0 radians, with the dynamic temperature step method having 2° C. steps, a soak time of 5 to 10 seconds, an initial strain of about 0.001 ($\Delta L/L$), and with autotension and autostrain options activated. The autotension was set to ensure that the sample remained under a tensile force throughout the run, and autostrain was set to allow the strain to be increased as the sample passed through the glass transition and became softer. After the 5 minute soak time, the temperature in the sample oven was reduced in 20° C. steps until the starting temperature, typically −80° C. or −60° C., was reached. The final temperature of the run was entered into the software before starting the run, such that the data for a sample would extend from the glassy region through the transition region and well into the rubbery region.

The run was started and allowed to proceed to completion. After completion of the run, a graph of E', E", and tan delta, all versus temperature, appeared on the computer screen. The data points on each curve were smoothed, using a program in the software. On this plot, three points representing the glass transition were identified: 1) The temperature at which E'=1000 MPa; 2) The temperature at which E'=100 MPa; 3) The temperature of the peak in the tan delta curve. If the tan delta curve contained more than one peak, the temperature of each peak was measured. One additional value obtained from the graph was the minimum value for E' in the rubbery region. This value was reported as the equilibrium modulus, $E_o$ (Tables 3, 4, and 5).

c. Aging Testing

Aging Test for Hydrolytic Stability

Additional test samples prepared in the same manner were subjected to aging in a controlled chamber maintained at 85° C. and 85% relative humidity. After 2 weeks of aging under these conditions, a set of test samples was removed and tested in accordance with the above dynamic mechanical analysis procedures, and an equilibrium modulus $E_0$ determined. This value was compared to the $E_0$ prior to aging and the result was reported as the percent $E_0$ loss or change after 2 weeks aging relative to the initial value. Further sets of samples were removed from the chamber after aging for 4, 8, and 12 weeks and tested in the same manner, and the results were reported as the percent $E_0$ loss or change after 4, 8, and 12 weeks. Hydrolytic stability data were shown in Table 5.

d. Viscosity

The viscosity was measured using a Physica MC10 Viscometer. The instrument was set up for the conventional Z3 system, which was used. The samples were loaded into a disposable aluminum cup by using the syringe to measure out 17 cc. The sample in the cup was examined and if it contained an excessive amount of bubbles, they were removed by a direct means such as centrifugation, or enough time was allowed to elapse to let the bubbles escape from the bulk of the liquid.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value to produce the desired shear rate. The shear rate was typically 50-100 sec$^{-1}$.

If the viscosity value varied only slightly (less than 2% relative variation) for 15 seconds, the measurement was complete. If not, the temperature may not yet have reached an equilibrium value, or the material may have been changing due to shearing. In the latter case, further testing at different shear rates was needed to define the sample's viscous properties. The results reported were the average viscosity values of three test samples.

e. Thixotropy

Thixotropy of each composition was determined by visual observation of the composition flowing. Non-thixotropic fluids were observed to flow substantially evenly, while thixotropic fluids were observed to flow unevenly, in part due to initiation of gelling or clumping regions forming in the composition while the fluid was at rest.

f. Method for Measuring the Acid Value AV

The acid value of a material was measured using a potentiometric titration technique. In this test, a known weight of the sample was dissolved in approximately 80 mL of acetone. This solution was titrated to a potentiometric endpoint using standardized 0.1N potassium hydroxide in methanol. The acid value was calculated using equation (1):

$$AV = (V \times N \times 56.1)/W \qquad (1)$$

Where
AV=acid value in mg KOH/g
V=volume of titrant at the equivalence point
N=normality of the KOH titrant solution
W=weight of sample in grams For samples with acid values below about 0.5 mg KOH/g, 0.01 N KOH in methanol was used as the titrant.

Having described specific embodiments of the present invention, it will be understood that many modifications thereof will readily appear or may be suggested to those skilled in the art, and it is intended therefore that the invention is limited only by the spirit and scope of the following claims.

What is claimed is:

1. A radiation-curable composition comprising:
   a) 40 wt % -80 wt % of a polyester urethane (meth)acrylate oligomer, relative to the total weight of the composition, prepared from ortho-carboxylic polyester polyols having a molecular weight of 550 or more and less than 1000, wherein the polyester urethane (meth)acrylate oligomer comprises a polyester backbone and a reactive termini that provide the radiation curable property to the oligomer, and urethane linking groups;
b) phenoxyethyl acrylate (PEA);
c) 0 wt %-10 wt %, relative to the total weight of the composition, of one or more photoinitiators;
wherein said composition has a glass transition temperature greater than 45° C., and
wherein said composition, after cure, has a secant modulus greater than 600 MPa at a temperature of 23+/−2° C., and an elongation at break of at least 10° % at a temperature of 23+/−2° C.,
wherein said composition has a viscosity of 1200 mPa·s to 8000 mPa·s at 25° C.

2. The composition according to claim 1, wherein said composition has a glass transition temperature from 45° C.-130° C.

3. The composition according to claim 1, wherein said composition, after cure, maintains mechanical integrity when aged at 85° C. and 85% Relative Humidity for 12 weeks.

4. The composition according claim 1, wherein said composition, when cured and aged for 12 weeks under 85° C. and 85% Relative Humidity shows a change in equilibrium modulus $E_0$ of 28% or less at a temperature of 23+/−2° C.

5. The composition according to claim 1, wherein said composition is a secondary coating, a colored secondary coating, an ink composition, a matrix composition or an upjacketing composition.

6. The composition according to claim 1, wherein said composition is a secondary coating, and wherein said polyester urethane (meth)acrylate oligomer has a molecular weight of between 900 to 2000.

7. The composition according to claim 1, wherein said composition is an ink composition, a matrix composition, or an upjacketing composition; and wherein said polyester urethane (meth)acrylate oligomer has a molecular weight of 500-5000.

8. The composition according to claim 1, wherein said ortho-carboxylic polyester polyol has a viscosity at 25° C. of higher than 4 Pa·s.

9. A radiation curable composition according to claim 1, comprising a composition which has after cure, the following physical properties:
a) a secant modulus of 600 MPa to 1800 MPa at a temperature of 23+/−2° C.;
b) an elongation at break of from 10% to 30% at a temperature of 23+/−2° C.;
c) a glass transition temperature of from 45° C. to 100° C.; and
d) a viscosity of from 1300 mPa·s to 6000 mPa·s at 25° C.

10. The composition according to claim 9, wherein said composition further comprises one or more pigments.

11. The composition according to claim 9, wherein said composition further comprises one or more dyes.

12. A coated optical fiber comprising a coating formed from the radiation-curable composition according to claim 1.

13. An optical fiber ribbon comprising a plurality of coated optical fibers according to claim 12.

14. The coated optical fiber of claim 12 wherein said coating is a secondary coating, an ink coating, an upjacketing coating, or a matrix material coating.

15. A process for forming a coated optical fiber comprising applying the composition according to claim 1 as a secondary coating, ink coating, upjacketing coating or matrix material coating.

* * * * *